US006985104B2

(12) United States Patent
Large et al.

(10) Patent No.: US 6,985,104 B2
(45) Date of Patent: Jan. 10, 2006

(54) METHOD AND SYSTEM FOR VARIABLE DATA RATE TRANSMISSION IN RTK GPS SURVEY SYSTEM

(75) Inventors: Peter Large, Westminster, CO (US); Geoffrey R. Kirk, San Francisco, CA (US); Michael Timo Allison, Salisbury (GB)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 10/209,613

(22) Filed: Jul. 29, 2002

(65) Prior Publication Data

US 2004/0145516 A1    Jul. 29, 2004

(51) Int. Cl.
*H04B 7/185* (2006.01)
*G01S 5/14* (2006.01)

(52) U.S. Cl. .................................. 342/357.09
(58) Field of Classification Search ............... 701/207, 701/213, 214, 215; 342/357.03, 357.09, 342/357.12, 357.14, 357.17
See application file for complete search history.

(56) References Cited

U.S. PATENT DOCUMENTS 5,678,182 A * 10/1997 Miller et al. ............... 455/12.1
5,748,651 A * 5/1998 Sheynblat .................. 714/800
6,229,478 B1   5/2001 Biacs et al. ................. 342/357
6,268,824 B1 * 7/2001 Zhodzishky et al. ... 342/357.04
6,567,041 B1 * 5/2003 O'Dell ................... 342/357.03
2002/0126046 A1 * 9/2002 Counselman et al. ....... 342/464
2003/0142656 A1 * 7/2003 Padovani et al. .......... 370/347

FOREIGN PATENT DOCUMENTS

EP          0 588 598 A1     3/1994

OTHER PUBLICATIONS

Database WPI Section El, Week 200247 Derwent Publications Ltd., London, GB; Class WO2, AN 2002-441855 SP002246945 & KR 2002 002 034 A (Geosystems, Inc) Jan. 9, 2002 abstract.

* cited by examiner

*Primary Examiner*—Thomas G. Black
*Assistant Examiner*—Christine M. Behncke

(57) ABSTRACT

A method and system for variable data rate transmission in a real-time kinematic (RTK) positioning system. An RTK positioning system having a reference station and a rover utilizes wireless communications for data transfer. The data transmission rate between the reference station and the rover is dynamically controlled by a programmable transmission controller. The transmission rate is determined on the basis of specific parameters. Parameters that may be used to determine the data transmission rate include rover demand, required rover accuracy, satellite positioning system (SATPS) events, the required data for ambiguities, and the type and content of the data transmitted.

31 Claims, 12 Drawing Sheets

METHOD AND SYSTEM FOR VARIABLE DATA RATE TRANSMISSION IN RTK GPS SURVEY SYSTEM

FIELD OF THE INVENTION

The present claimed invention relates to the field of satellite positioning systems. More particularly, the present claimed invention relates to a method for communication between elements of an RTK positioning system.

BACKGROUND ART

In general, GPS (Global Positioning System) positioning techniques fall into two main categories, navigation and surveying. Traditionally, surveying has required greater precision and thus used differential techniques requiring long periods of observation, whereas navigation has required less precision and emphasized real-time position determination. The development of real-time kinematic (RTK) positioning has resulted in systems that are widely applied to both surveying and navigation.

An RTK positioning system typically includes a constellation of satellites, a base or reference station, and a rover.

For purposes of this disclosure, a satellite refers to any fundamental source of raw position data such as that transmitted by the GPS, GLONASS, or planned Galileo orbiting satellites, or an earthbound source (e.g., pseudolite). A satellite positioning system (SATPS) refers to a system using either extra-terrestrial satellites or terrestrial satellites (pseudolites) as sources of raw position data.

A reference station incorporates a SATPS data receiver and a wireless link for communication with the rover. The reference station may be a single base station, collection of base stations, or a virtual reference station (VRS). More than one rover may be linked to a reference station, particularly when the reference station comprises a network of base stations. Further information regarding virtual reference stations is provided in U.S. patent application Ser. No. 10/078,294, Kirk et al, filed Feb. 15, 2002, which is incorporated herein by reference.

In RTK, centimeter level accuracy is obtained by having both the reference station and the rover track the carrier phases of the same satellite(s) at the same time. High accuracy position determination is achieved by applying a mathematical model for relative positioning (e.g., double-difference model) to the simultaneous measurements of the reference station and rover. The double differences essentially eliminate common mode errors (e.g. clock errors), and can be processed to produce a precise baseline (dx, dy, dz) between the reference station and rover. When the reference station position is accurately known in a given coordinate frame, the rover position can also be determined in the same frame. Even if the reference station position is not accurately known, precise relative positioning can still be carried out.

The data collected by the reference station and the data collected by the rover is combined at a single location for processing and position determination. For RTK, this data combination is usually done by wireless communication, and the data may be combined at the reference station, rover, or other location for processing. It is the immediate communication between the rover and reference station that enables real-time determination of relative or absolute position, velocity and time, as opposed to post processing.

The data communication between a rover and a reference station may be unidirectional or bidirectional, depending upon the allocation of the data processing functions and the type of wireless link employed. Depending upon the RF band used for data transmission, power and distance limitations may result in the rover having only a receiving capability when direct radio communication is used.

An alternative to direct radio communication is the use of a network such as a cellular network or other wireless network. The use of a wireless network can overcome problems with interference, distance, licensing, etc.

Historically, the link between a reference station and a rover has been made as a continuous connection with periodic transmission of data. Correction data from a reference station may be formatted according to various proprietary or published formats, e.g., the Radio Technical Commission Marine (RTCM) format or the Trimble CMR/CMR+. For RTK using double differencing and the RTCM format messages 18 and 19, data is updated about every 0.5 to 2.0 seconds. For RTK, data rates of between 2,400 bps and 9,600 bps are commonly used. The data transmission rate may be manually selectable.

Current RTK systems often have a dedicated wireless link, so there is no economic incentive to reduce the amount of data transmitted. Although the transmission rate may be selected by the user, it is not automatically controlled on the basis of economic considerations. The lack of an incentive to reduce the amount of data transmitted over a direct link contributes to crowding of the frequency band used for transmission and reduces overall efficiency in both spectrum usage and in transmitter power consumption.

Packet-switched services such as Cellular Digital Packet Data (CDPD), General Packet Radio Service (GPRS), Enhanced Data Rates for Global Evolution (EDGE) and 3G Packet Data, and wireless IP networks are examples of wireless communications networks that can be used to provide communications for an RTK positioning system as an alternative to direct radio links. The use of these services can overcome difficulties associated with direct radio communications; however, the cost of these packet switched services can be based upon data throughput, and traditional communications in RTK systems lack a method for evaluating the cost/benefit of transmitted data. When high bandwidth packet-switched networks are used, considerable cost can be incurred when large volumes of data with little or no value are transmitted.

Thus a need exists for a method of controlling the data transmission rate in an RTK positioning system so that cost effective position determination can be performed when using communications networks that have throughput based costs. There is also a need for mitigation of interference in crowded regions of the electromagnetic spectrum used for communications.

SUMMARY OF INVENTION

Accordingly, the present invention provides a system and method for dynamically controlling the data transmission rate in an RTK positioning system so that the economics of packet-switched communications may be accommodated. Rather than transmitting information at a cost without regard to its received value, the present invention applies a mechanism for determining the data transmission rate in an RTK positioning system based upon the expected value of the information.

A method and system for variable data rate transmission in a real-time kinematic (RTK) positioning system is disclosed. An RTK positioning system having a reference station and a rover utilizes wireless communications for data transfer. The data transmission rate between the reference station and the rover is dynamically controlled by a programmable transmission controller.

The transmission rate is determined on the basis of specific parameters. Parameters that may be used to determine the data transmission rate include rover demand, required rover accuracy, satellite positioning system (SATPS) events, and the type and content of the data transmitted. The data transmission rate may also be based upon the data required for initializing the system and maintaining initialization, (also referred to as data for ambiguities).

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances well known methods, procedures, components, and circuits have not been described in detail as not to unnecessarily obscure aspects of the present invention.

Figure 1:
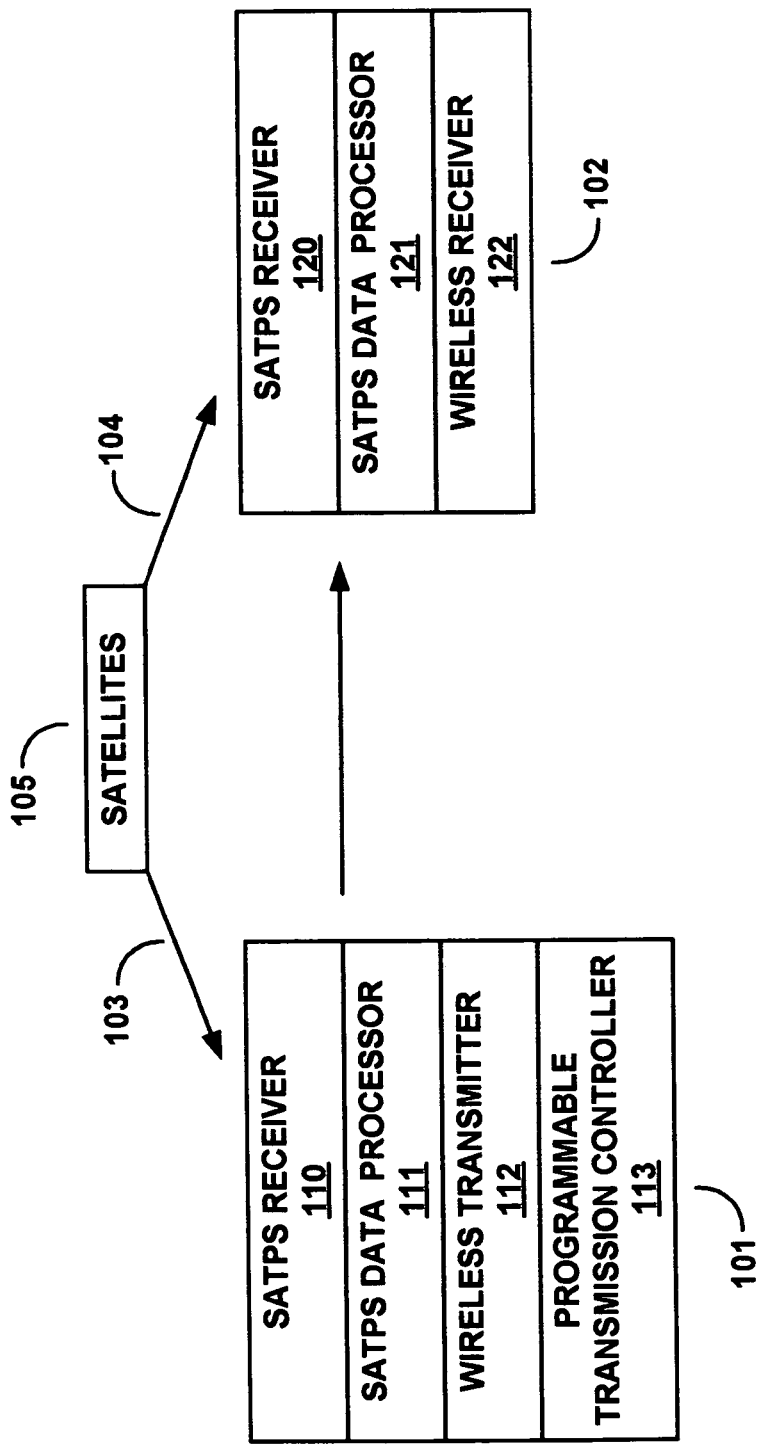
FIG. 1 shows a basic configuration schematic for a rover and reference station in accordance with an embodiment of the present claimed invention.

FIG. 1 shows a basic configuration schematic for an RTK system with a reference station 101 and a rover 102 in accordance with an embodiment of the present claimed invention. The reference station (e.g., a single base station) receives a raw data signal 103 from a constellation of satellites 105, and the rover 102 receives a data signal 104 from the constellation of satellites 105. In general, the received data signals 103 and 104 are derived from the same set of transmissions from the satellite constellation 105, but may differ. For example, either the reference station 101 or the rover 102 may be blocked from a particular satellite.

The reference station includes a SATPS receiver 110 for receiving the data signal 103, a SATPS data processor 111, and a wireless transmitter 112 for transmitting data to the rover 102. These three elements may be provided in a single base station, along with the addition of a programmable transmission controller 113.

The SATPS receiver 110 receives the data signals 103 from the satellites and provides raw SATPS data to the SATPS data processor 111. The SATPS data processor may include functions including position determination, the calculation of corrections, and the formatting of data for transmission.

The programmable transmission controller 113 accepts as input a desired data transmission rate and exercises control over the data flow between the processor 111 and the wireless transmitter 112 in order to provide the desired data transmission rate. The programmable transmission controller 113 and SATPS data processor 111 may be implemented as physically discrete processors with independent instruction sets, or they may be implemented as a single physical processor capable of accepting instructions for both SATPS data processing and data flow control to the wireless transmitter 112. Alternatively, the wireless transmitter may be a cellular telephone, in which case the controller may be integrated with the cellular telephone. The wireless transmitter 112 may employ a protocol (e.g. IEEE 802.11b) that enables communication to a wired packet-based network.

The rover 102 has a SATPS receiver 120 for receiving SATPS data that may be used by a SATPS data processor 121 for position determination. The rover 102 also has a wireless receiver 122 for receiving data from reference station 101. Data from the reference station 101 (e.g., raw data or derived correction data) may also be used by the SATPS data processor 121 for position determination.

Figure 2A:
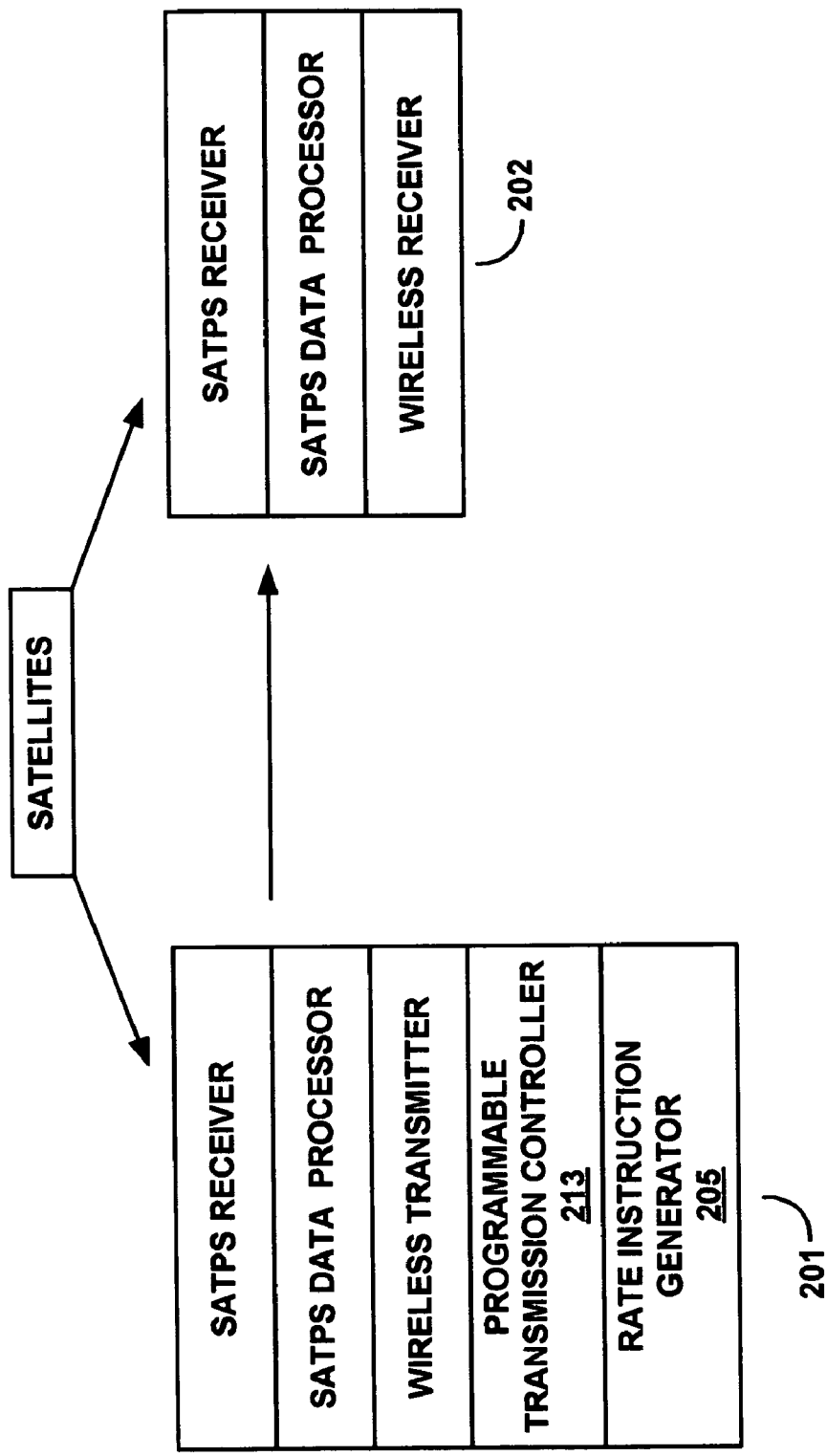
FIG. 2A shows a unidirectional transmission configuration schematic for a rover and reference station with a rate instruction generator in accordance with an embodiment of the present claimed invention.

FIG. 2A shows a unidirectional transmission configuration schematic for a rover 202 and reference station 201 with a rate instruction generator 205 in accordance with an embodiment of the present invention. The programmable transmission controller 101 of FIG. 1 may receive instructions from different sources. In the example of FIG. 2A, the rate instruction generator 205 provides the instructions to the programmable transmission controller 213. Since the rover 202 does not have a wireless transmission capability, the rate instruction generator 205 functions without feedback from the rover 202. For example, a scheduled survey may be made in which the rover 202 moves between a series of points according to a predetermined schedule. The rate instruction generator uses the schedule information to determine the data transmission rate. The functions of the rate instruction generator may be provided by dedicated hardware, or may be provided by a general purpose processor.

Figure 2B:
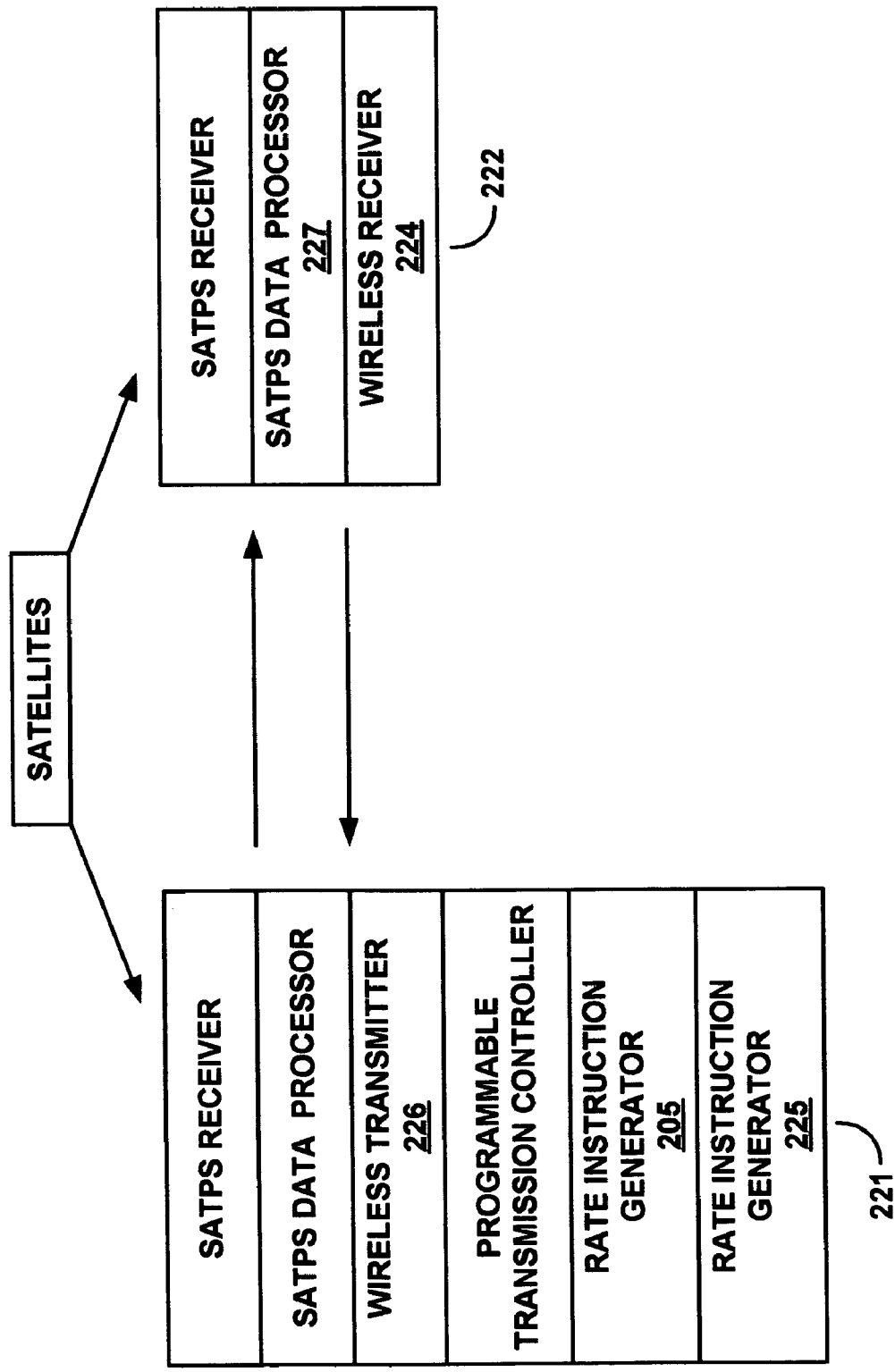
FIG. 2B shows a bidirectional transmission configuration schematic with implicit control for a rover and reference station in accordance with an embodiment of the present claimed invention.

FIG. 2B shows a bidirectional transmission configuration schematic with implicit control for a rover and reference station in accordance with an embodiment of the present invention. FIG. 2B is an example of a system configuration in which a reference station 221 and a rover 222 have a bidirectional communication capability. The rover 222 has a wireless transmitter 234 (e.g., FIG. 2C) enabling it to transmit data to the reference station 221. The data transmitted by the rover 222 may be received SATPS data position data, or other information.

For example, the rover could send to the reference station the current elevation mask being used at the rover. Thus the base would not send data below the rover elevation mask to avoid sending data which will not be used at the rover 222. Alternatively, the rover 222 could tell the reference station 221 which satellites are being tracked at a particular time. If the line of sight to a satellite is blocked at the rover 222 for any reason, sending that data from the reference station 221 is unnecessary.

The data transmitted by the rover 222 is received at the reference station 221 by a wireless receiver 225. The rate instruction generator 205 uses the received data to determine a transmission rate for the programmable transmission controller. Since the transmission rate is not directly specified by the rover 222, but is determined on the basis of data provided by the rover, this scheme is referred to as an implicit method for data transmission rate control. In general, mobility constraints may limit the processing capability for a rover as compared to that available at a base station.

An implicit scheme places the computational burden for transmission rate instruction generation on the base station, which is typically better equipped to handle complex algorithms. An implicit scheme is also useful when the data transmission rate determination is derived from information that is transmitted from the rover in the normal course of operation, without requiring the transmission of additional explicit instructions for data transmission rate control.

Table 1 below shows three general modes of operation, each having a range of data rates associated with it. The data rate for transmission between the reference station and rover may be measured in fix units. A fix unit is the amount of data required to provide position fix. In Tracking and Positioning Mode (normal operation), the data rate is about 1 to 20 fix units per second. In Coarse Positioning Mode, the data rate is about 0.05 to 1 fix units per second. In the Traveling Mode, in which the basic data requirement is for maintaining ambiguity resolution, the data rate is about 1 fix unit every 20 seconds to 1 fix unit per hour.

TABLE 1

| MODE | DATA RATE |
| --- | --- |
| Tracking and Positioning | 1–20 fix units per second |
| Coarse Positioning | 1 fix unit every 1 to 20 seconds |
| Traveling Mode | 1 fix unit every 20 seconds to 1 hour |

The data rates associated with the three modes described above are distinct from the data transmission rate of the wireless link. The mode used determines the overall data volume over a period of time, but does not necessarily correlate with the data rate used for wireless transmission. A high frequency wireless link (e.g., 2.5 GHz) could handle all three modes with a small duty cycle.

The wireless receiver 225 and wireless transmitter 226 of the base station 221 may be provided by a telephone device. Similarly, the wireless receiver 224 and wireless transmitter 234. (e.g., FIG. 2C) of the rover 222 may also be provided by a telephone device. When both the rover and the base station use a telephone device, communication may be established using a packet switched service such as the General Packet Radio Service (GPRS) or Cellular Digital Packet Data (CDPD) service.

If TCP/IP is used for communication between the base station and rover, the data transmission rate could be implied by the selection of a particular IP socket from a set of available IP sockets that have been associated with different transmission rates. This set of IP sockets may also be differentiated on the basis of data type.

For example, a reference station network may have multiple simultaneous IP sockets, on each of which is available the reference station data (e.g., data) but at different transmission rates (e.g., 10 Hz, 5 Hz, 1 Hz, 0.5 Hz, and 0.1 Hz). Additionally, sockets could exist on which certain subsets for the measurement data are available, at a range of suitable transmissioh rates. The rover selects which socket to connect to, depending upon the immediate transmission rate requirement. The-selection may be carried out at the rover, based on the lowest acceptable frequency and content required at that time, when current variables such as solution filter status, tolerance requirement, distance from stakeout point, satellite availability and geometry, augmentation system status, etc., are taken into consideration.

Figure 2C:
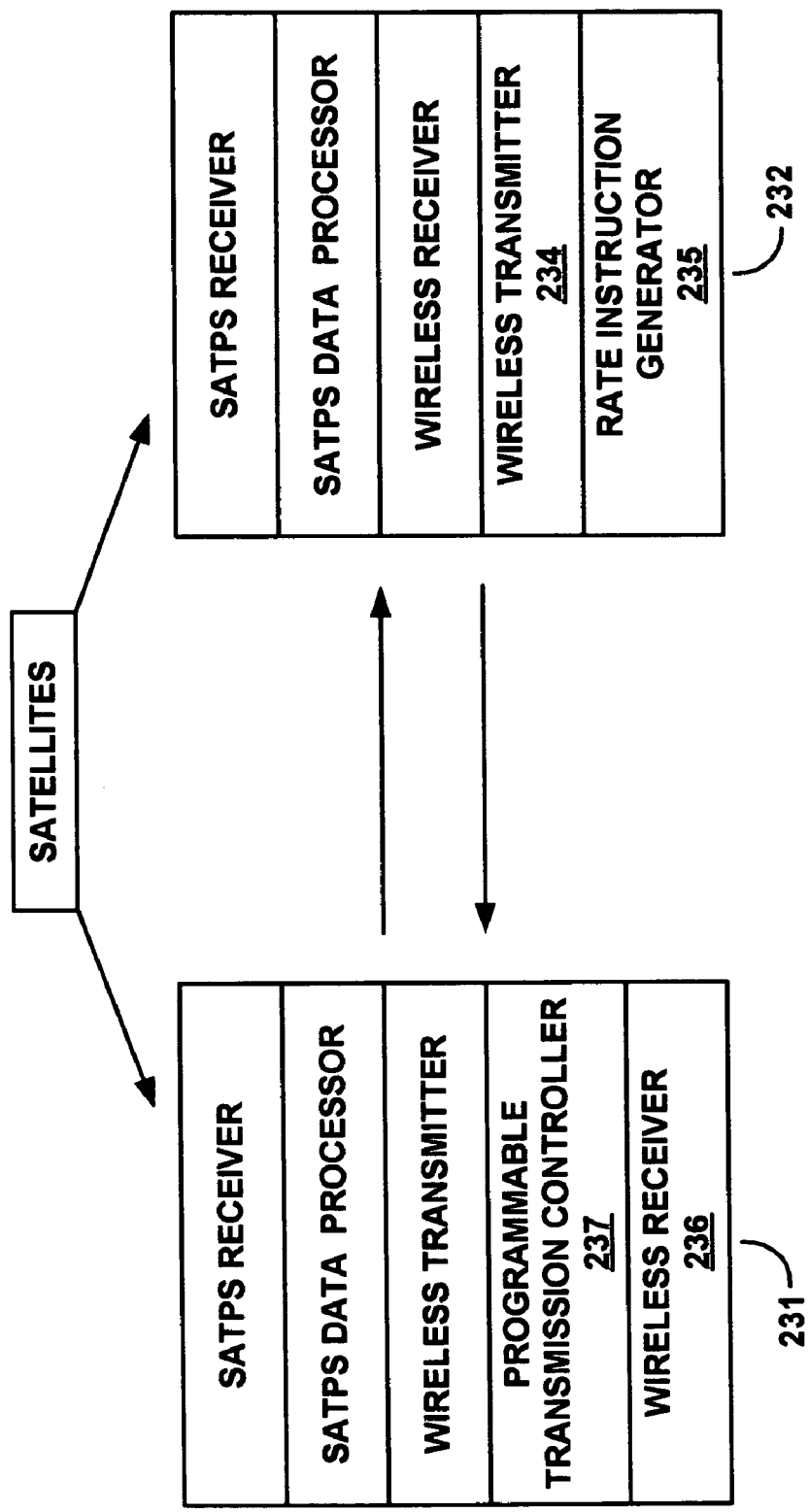
FIG. 2C shows a configuration schematic for a rover and reference station with explicit control in accordance with an embodiment of the present claimed invention.

FIG. 2C shows a configuration schematic for a rover and base station with explicit control in accordance with an embodiment of the present invention. The rover 232 includes a rate instruction generator 235 for determining a data transmission rate instruction for a reference station 231. The data transmission rate is transmitted to the reference station 231 by a wireless transmitter 234 and received at the reference station 231 by a wireless receiver 236. The programmable transmission controller 237 then sets the data transmission rate according to the instruction. Explicit control may be used when "on-off control" is desired. For example, the rover may set the data transmission rate to zero while in transit from one survey point to another. Alternatively, the rover may calculate a transmission rate on the basis of its-position or distance from the reference station. Or it may request a subset of the available data types at some rate according to the instantaneous requirements.

For RTK positioning systems in which both the base station and rover have programmable processors, the rate instruction generation function may be programmed into both the base station and rover, thereby allowing both implicit and explicit control of data transmission rate in the system. The base may also have multiple, parallel transmission controllers to serve multiple rovers, or it may have a single transmission controller which can take rate instructions from multiple rovers and generate the minimal common set of data required.

Figure 3:
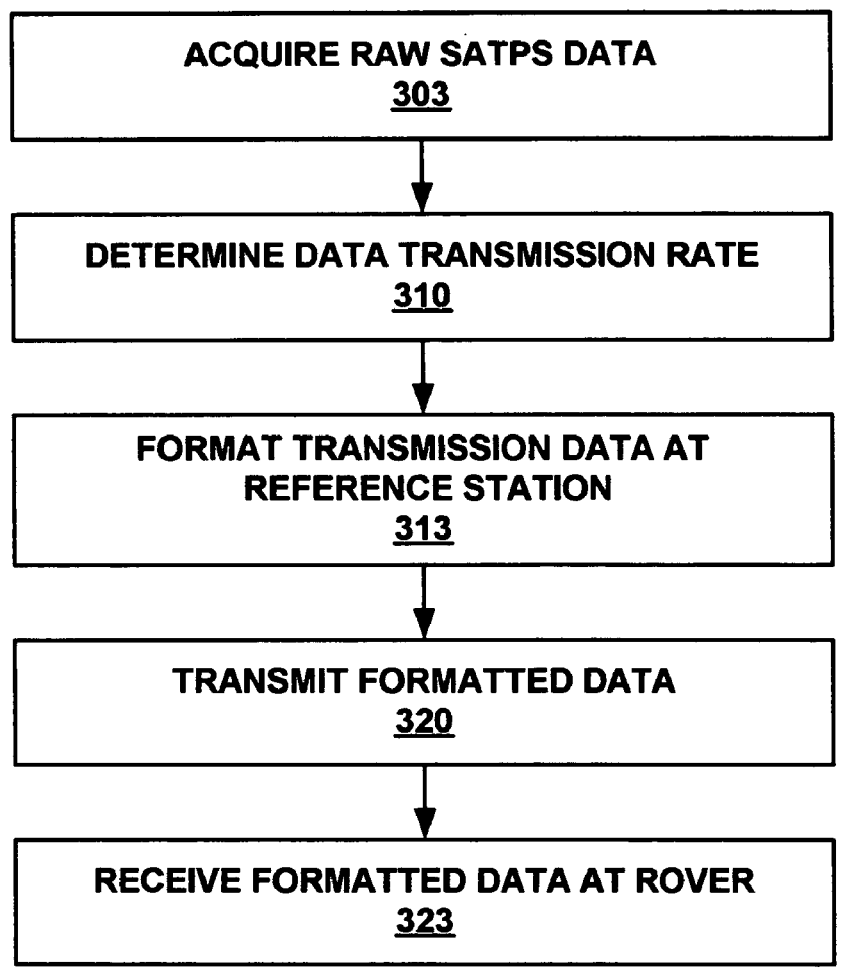
FIG. 3 shows a general flow chart for a position determination process using variable data rate transmission in accordance with a method embodiment of the present claimed invention.

FIG. 3 shows a general flow chart 300 for a position determination process using variable data rate transmission in accordance with a method embodiment of the present invention. In this embodiment, a reference station exercises autonomous control of the data transmission rate without requiring input from the rover. The method of FIG. 3 corresponds to the system of FIG. 2A.

In step 303, raw SATPS data is acquired by a reference station. In addition to providing the information required for position determination and data correction, the raw SATPS data received by the reference station provides information regarding the state of the satellite system (e.g., a satellite vehicle rising or setting at the horizon.

In step 310, The reference station determines the data transmission rate on the basis of information currently available to it. This information may be the state of the satellite constellation, a survey schedule for the rover's activities, pre-programmed rover accuracy requirements, or information relating to the present quality of service for wireless communication. For direct radio transmission that does not use a network, the data transmission rate may be determined on the basis of the potential for interfering with other communications in the same frequency band.

It should be noted that the overall data transmission rate is a function of the content of a data message (e.g. RTCM message) and the rate at which the message is sent. The data transmission rate may be varied by altering the length of a data message, by altering the rate at which a message is transmitted, or both.

In step 313, the transmission data is formatted by the reference station. Formatting of the transmission data may include correction calculation and formatting according to the Radio Technical Commission Marine (RTCM) standards (or the Trimble format CMR/CMR+, other manufacturer's proprietary formats). Additional formatting associated with a communication protocol such as UDP/IP may also be performed.

In step 320, the data is transmitted. The transmission may be a direct broadcast, or it may be transmitted on a network using a connectionless protocol that does not require acknowledgment. In step 323, the formatted data is received at the rover.

Figure 4:
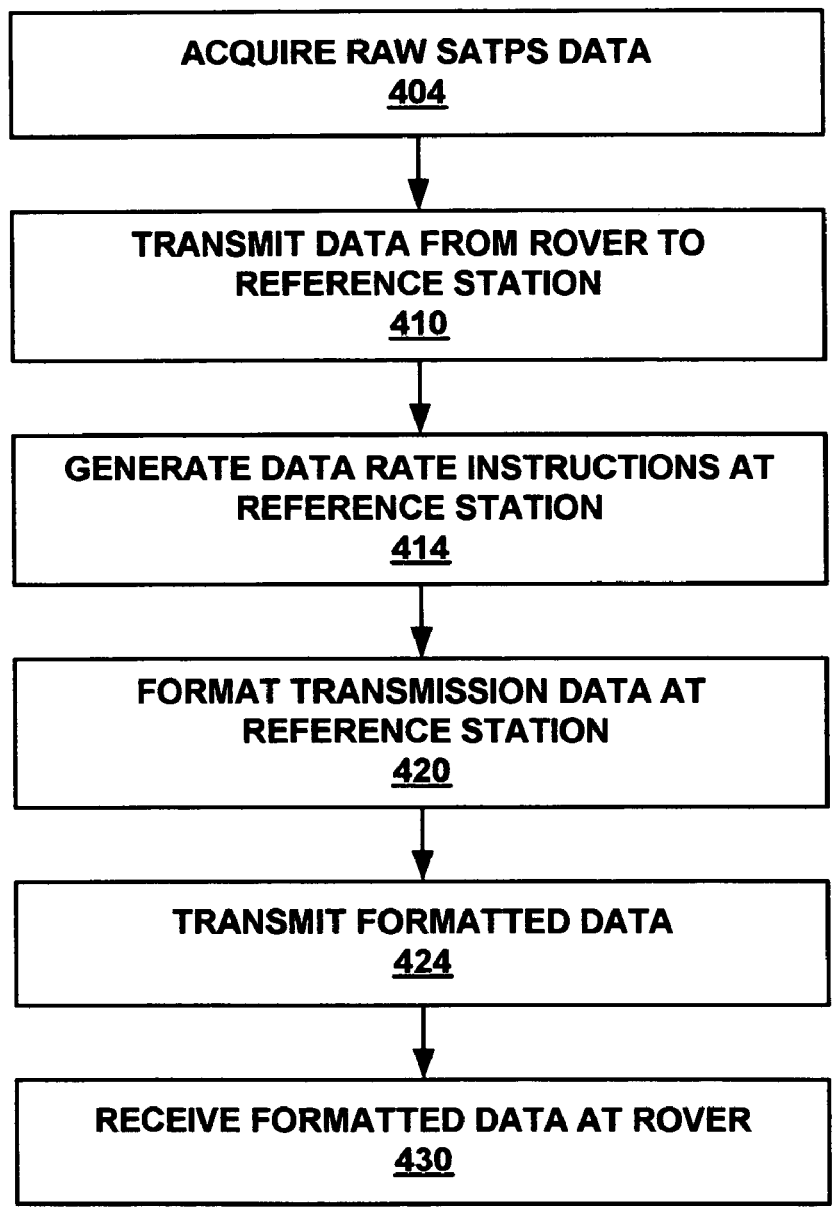
FIG. 4 shows a flow chart for position determination process using variable data rate transmission with implicit rate control in accordance with a method embodiment of the present claimed invention.

FIG. 4 shows a flow chart 400 for position determination process using variable data rate transmission with implicit rate control in accordance with a method embodiment of the present invention. The method of FIG. 4 is associated with the system shown in FIG. 2B.

In step 404, raw SATPS data is acquired at the rover and at the reference station. In step 410, data is transmitted by the rover to the reference station. The data transmitted by the rover may include raw and processed data. The rover may indicate the type of data required from the reference station or data that may be deleted from a message.

In step 414, the reference station generates data rate instructions for the programmable transmission rate controller using data received from the rover.

In step 420, the reference station formats the data to be transmitted to the rover. Since bidirectional communication is operational between the reference station and rover, a protocol such as TCP/IP may be used. Compression and error control with acknowledgments may be used.

In step 424, the data is transmitted to the rover. The transmission may be made over a direct radio link or a wireless connection to a network. In step 430, the data is received at the rover.

Figure 5:
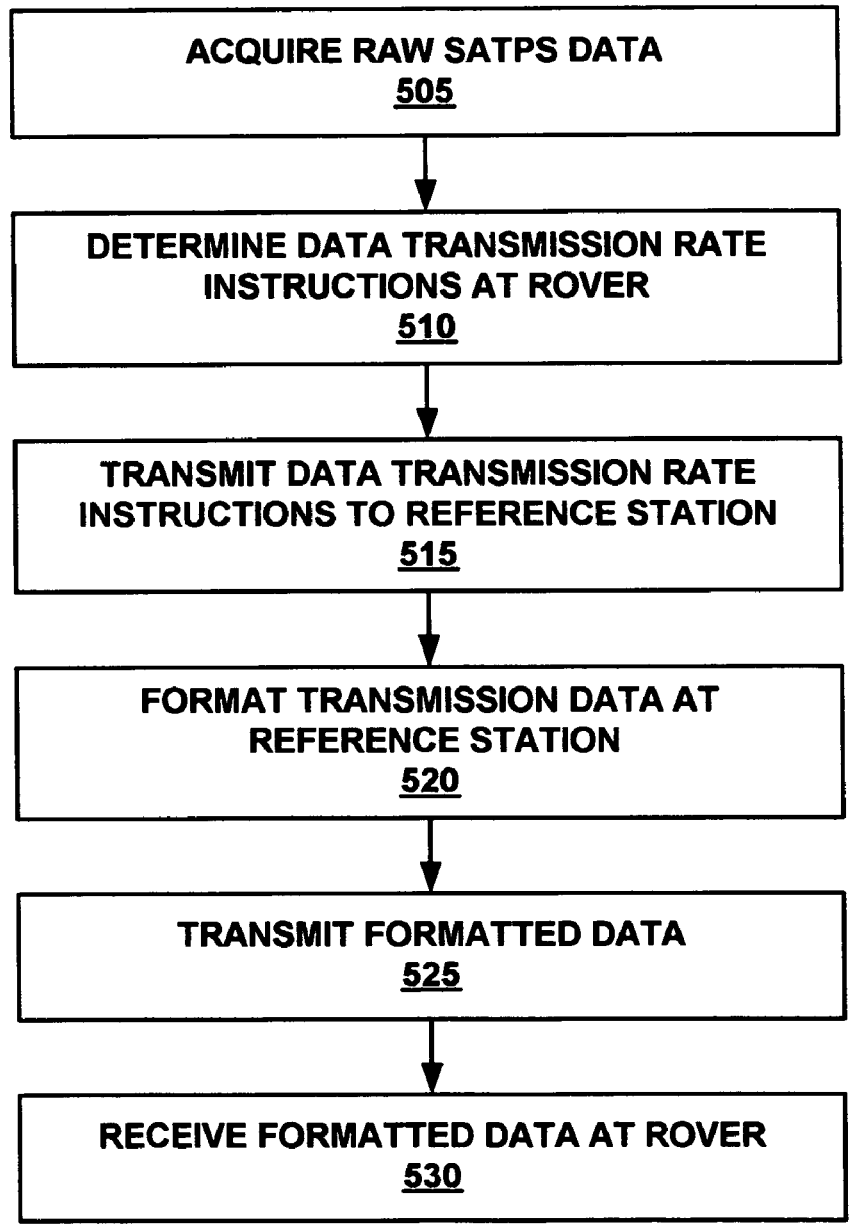
FIG. 5 shows a flow chart for a position determination process using variable data rate transmission with explicit rate control in accordance with a method embodiment of the present claimed invention.

FIG. 5 shows a flow chart for a position determination process using variable data rate transmission with explicit rate control in accordance with a method embodiment of the present invention.

In step 505, raw data is acquired by the rover and the reference station. In step 510, the rover determines a data transmission rate to be used by the reference station for data transmission. The data transmission rate is determined by the rover on the basis of information that is currently available to it. For example, when staking out a point, the position accuracy requirement is low when the rover is far away from the point. As the rover gets nearer to the point, the accuracy requirement increases and thus the data transmission rate may be increased accordingly.

In step 515, the data transmission rate instructions are transmitted to the reference station. The transmission may be made by a direct radio link or may be made across a wireless link to a network. Typically, bidirectional communication between the rover and reference station would be carried out using the same protocol regardless of which entity initiated the communication. However, in situations where the data flow is sufficiently unbalanced (e.g., a larger data flow from the reference station to the rover), the reference station may use a different protocol than the rover.

For example, a reference station typically does not share the transmitter power constraint imposed on the rover by its requirement for mobility. A reference station may transmit data to a rover by direct radio link, while the rover uses a low power link to a cellular network.

In step 520, the data required by the rover is formatted by the reference station. Formatting of the transmission data may include correction calculation and formatting according to the Radio Technical Commission Marine (RTCM) standards or to other proprietary standards. Additional formatting associated with a communication protocol such as TCP/IP may also be performed.

In step 525, the formatted transmission data is transmitted to the rover. The transmission may be made over a direct radio link or a wireless connection to a network. In step 530, the data is received at the rover.

The data from base to rover (or vice versa) may not be formatted at all, or it may be passed through compression or encryption algorithms with recovery at the receiving end, while still having an element of dynamic control based on the factors described.

The system and method embodiments of the present invention that have been described above are not intended to be exclusive. For example, the generation of data rate transmission instructions may be performed local to either a base station or a rover in alternative fashion, by executing the appropriate instructions on a processor.

Either the base station or the rover may control which type of data is sent and how often, based on the prevailing conditions and immediate requirements. Certain data may be determined by either the base or rover to be redundant and thus removed from the transmission stream.

The data transmission rate may be altered by selective transmission of data. For example, during initialization a rover requires all measurement types, at a given rate. After initialization, it may only use a subset of the measurements. For example the rover might revert to L1 phase only (or phase rate only), at certain times and under certain conditions.

SATPS events (e.g., cycle slips or constellation configuration changes) may be used by either the rover or the reference station as parameters for modifying the data transmission rate. In addition to processing of data, the reference station and/or rover may log data that it receives. A discussion of SATPS events that may influence data transmission rates is provided in U.S. Pat. No. 5,916,300; issued to Kirk et al on Jun. 29, 1999; the entirety of which is incorporated by reference herein.

In an RTK system, the data transmitted over the wireless link includes data for ambiguities and data for positioning. Data for ambiguities may include data required to resolve new satellite phase ambiguities, and to maintain these ambiguities (for example, after a cycle-slip or temporary loss of lock due to an obstruction to the line-of-site between the rover antenna and a satellite). Data for ambiguities typically does not require a continuous data stream. Data for positioning usually comprises a continuous data stream with some data rate greater than zero. The data rate is a function of various parameters such as position accuracy and position latency (difference between the time of position and the current time).

In a method embodiment, differential GPS positioning may be carried out using the code phase measurements only, or phase smoothed code measurements, in which case ambiguities are not required to be solved, but an economic advantage can be gained through dynamic variation of message type and rate as a function of rover requirements.

In an RTK system, a minimum of 5 satellites are required to resolve phase ambiguities after which high precision positioning (fixed ambiguity positioning) is possible. This process is called "initialization", following which only 4 satellites are required to maintain lock although 5 or more satellite are preferable to allow computation of position statistics such as position variance (this is not possible with only 4 satellites if the rover is moving).

For example, after initialization, one of the initial 5 satellites may set below the horizon, leaving 4 satellites in a set of satellites called Set-A. Another new satellite may rise above the horizon. Once the phase ambiguity of the new satellite has been resolved, but not before, it can be added to form a set of 5 satellites called Set-B. At this point, any satellite from Set-A can be removed from the system (for example, obstructed from view) to leave a new set of 4 satellites called Set-C. Such a process may occur any number of times. However, if the current visible set (with resolved ambiguities) drops to less than 4 satellites, then the system becomes "uninitialized" and must wait for a total of 5 satellites to "initialize". Similarly, one or more satellites may be temporarily removed from the set, and added back, providing that ambiguities are maintained on at least 4 satellites at every measurement epoch. To reduce the chance of becoming uninitialized, it is important to resolve ambiguities on satellites as soon as possible, preferably using a high data rate from the base station.

The data for ambiguities is typically only required prior to initialization, and when resolving ambiguities for the current set of visible satellites. At all other times, data for ambiguities may not be required. Thus, if there is no concurrent requirement for data for positioning and data for ambiguities, the data link may be disabled at such times to reduce the expense of operating the RTK system. Optionally, data can be re-enabled at any time to perform tests on the set of ambiguities, to ensure that they were correctly resolved.

Specifically, data for ambiguities may be required for the following conditions: (i) A new satellite becomes available (rises above the horizon, or user specified elevation mask); (ii) a cycle-slip or loss of lock occurs on any tracked satellite; or (iii) to check the current set of ambiguities. When one of these conditions occur, the rover needs to enable the data stream from the base. The handling of initialization related events is a component of the overall data rate generation process. Although the requirement for positioning data may be set to zero, while a rover is in transit between survey locations, certain events may trigger data transmission in order to maintain initialization.

Figure 6:
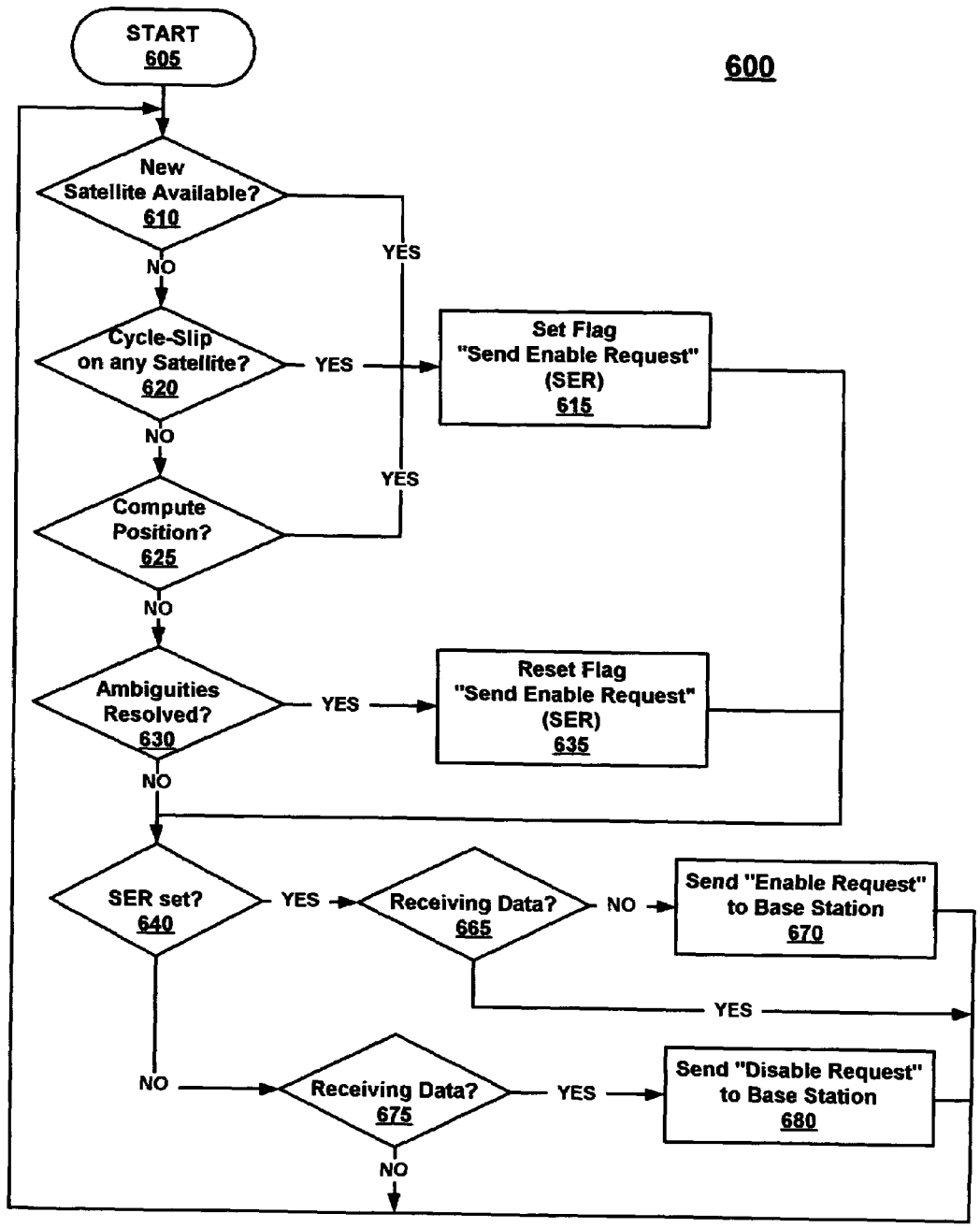
FIG. 6 shows a flow chart for a rover process comprising initialization functions in accordance with an embodiment of the present claimed invention.

FIG. 6 shows a flow chart 600 of a rover process loop that is responsive to events affecting initialization. The loop watches for events that may introduce ambiguities and enables data transmission so that the ambiguities may be resolved. Once all ambiguities are resolved, then the data stream can be disabled. Commands to enable and disable the data stream are sent from the rover to the base.

In step 605, the system is turned on and the loop is started. The loop may run continuously until the system is turned off. In step 610, a check is made for the availability of a new satellite. If a new satellite is available, the step 615 is executed by setting a "Send Enable Request" (SER) flag. If a new satellite is not available, then the existing constellation of satellites is checked for cycle-slips in step 620. If a cycle-slip exists, then step 615 is executed. If a cycle-slip is not detected, then the requirement for positioning data is checked in step 625.

The condition "compute position" 625 depends on the user's requirement to obtain a position in real-time. For example, in a survey application, a handheld controller can be used to set and reset the condition "compute position" when a survey mark needs to be observed, or when a stake-out is required (a method to locate a position at which a physical survey mark is to be placed). In another example, a machine control user interface can be used to set and reset this condition when the machine is actively controlling an earth-moving blade. If data is required for a position computation, then step 615 is executed.

In step 630, a check is made to see if ambiguities are resolved. If ambiguities are resolved, then the SER flag is reset in step 635. If ambiguities are not resolved, then the SER flag status is checked in step 640.

If the SER flag is set in step 640, then a check is made for data reception in step 665. If data is being received in step 665, then the loop is repeated. If data is not being received in step 665, then step 670 is executed and an "Enable Request" command is sent to the base station before repeating the loop.

If the SER flag is not set in step 640, then a check is made for data reception in step 675. If data is being received at step 675, then a "Disable Request" is sent to the base station before repeating the loop. If the SER flag is not set in step 640 and data is not being received at step 675, then the loop is repeated.

Figure 7:
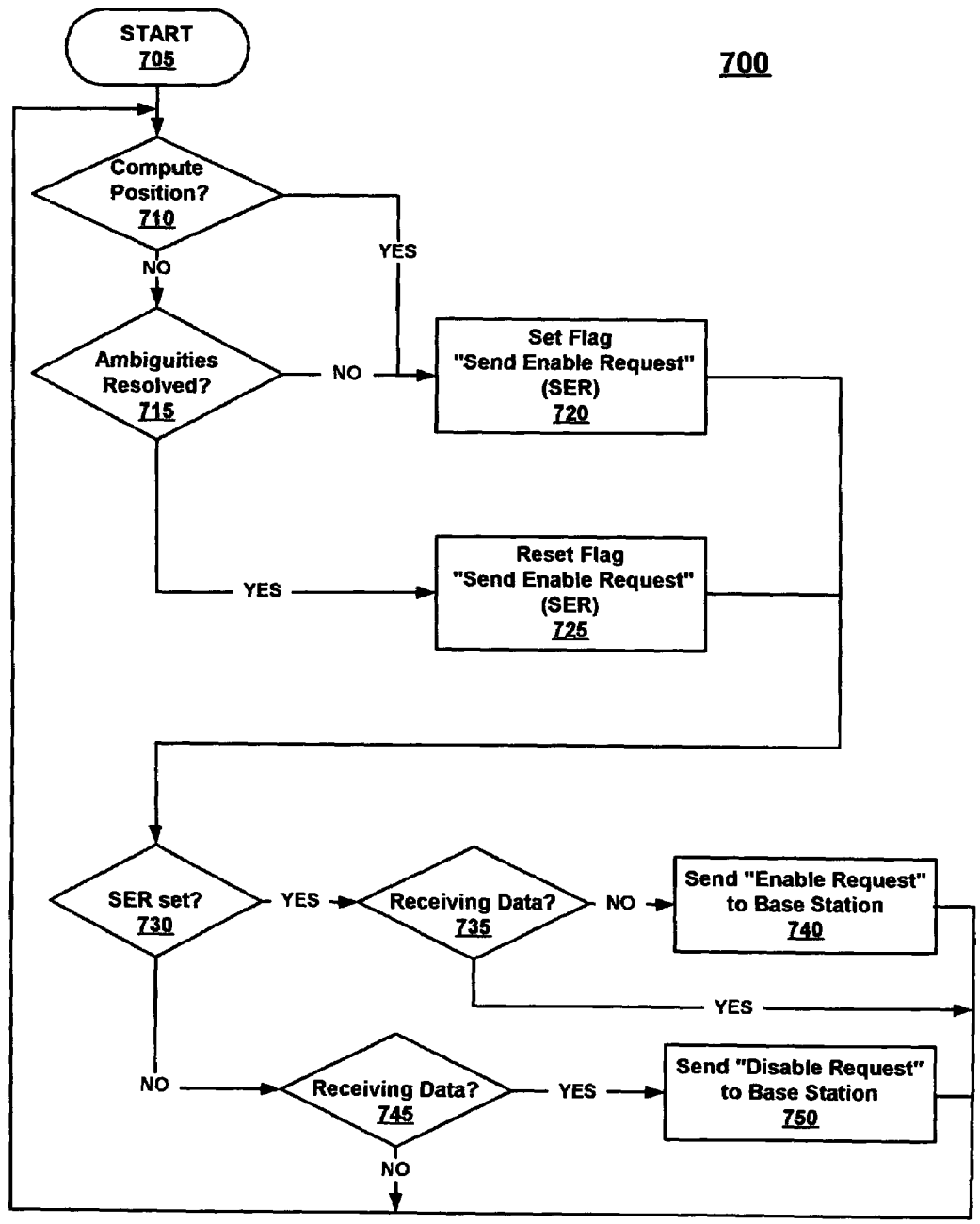
FIG. 7 shows a flow chart for a general rover process in accordance with an embodiment of the present claimed invention.

The method depicted in FIG. 6 makes no assumption that the commands to enable and disable transmission are received the first time they are sent. For example, the data link might not be reliable. Thus, checks are made to determine if the data is being received and whether this correlates with the status of the SER flag FIG. 7 shows a general flow chart 700 for a process similar to that of FIG. 6, in which two data requirements are reviewed. In step 705, the system is turned on and the loop is started. The loop may run continuously until the system is turned off. In step 710, a check is made for a positioning data requirement. If positioning data is required, then the SER flag is set in Step 720. If positioning data is not required, then a check is made in step 715 for an ambiguity data requirement. If data for ambiguities is required (ambiguities not resolved), then the SER flag is set in step 720. If ambiguities are resolved and data not required, then the SER flag is reset in step 725.

In step 730, the SER flag status is checked. If the SER flag is set in step 730, then a check is made for data reception in step 735. If data is being received in step 735, then the loop is repeated. If data is not being received in step 735, then step 740 is executed and an "Enable Request" command is sent to the base station before repeating the loop.

If the SER flag is not set in step 730, then a check is made for data reception in step 745. If data is being received at step 745, then a "Disable Request" is sent to the base station before repeating the loop. If the SER flag is not set in step 730 and data is not being received at step 745, then the loop is repeated.

Figure 8:
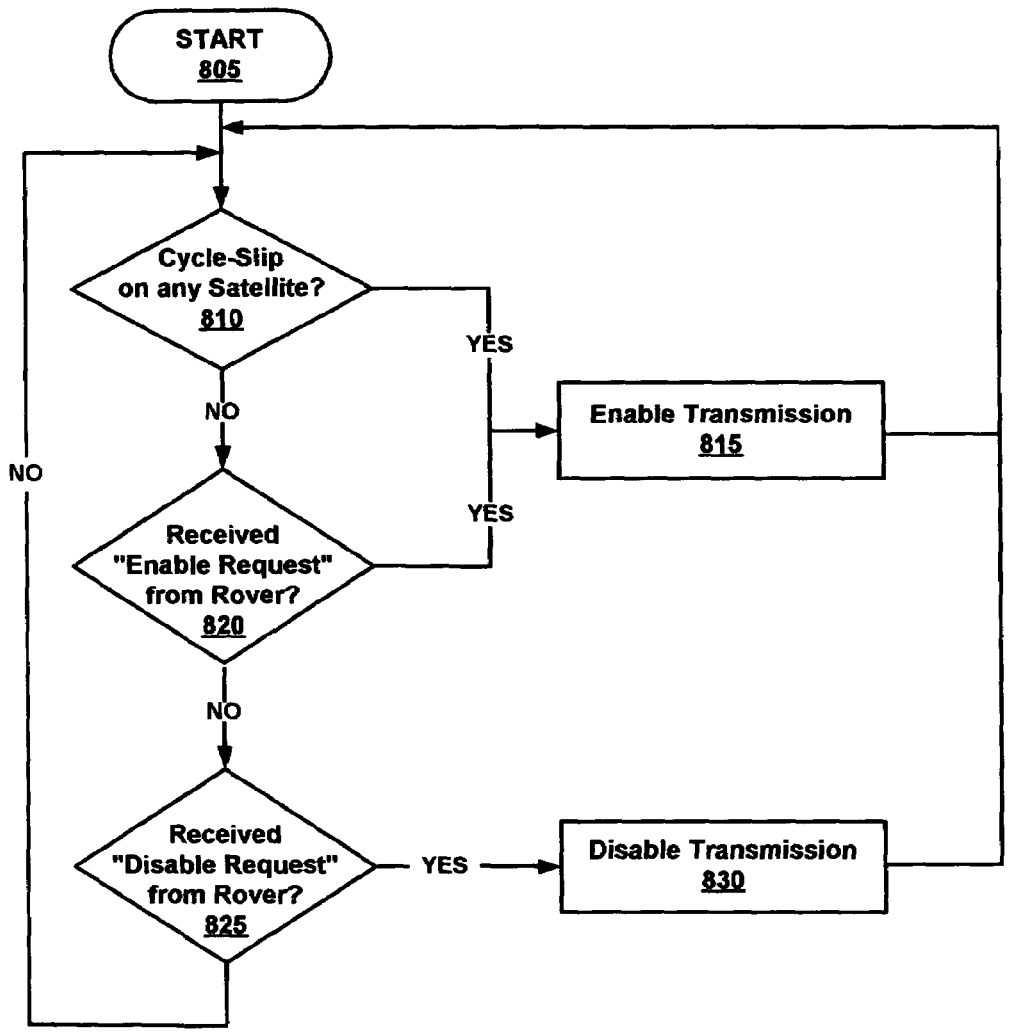
FIG. 8 shows a flow chart for a reference station process comprising initialization functions accordance with an embodiment of the present claimed invention.

FIG. 8 shows a flow chart diagram 800 for a base station process for data transmission control. The base station process shown is less complex than the rover process since the base station does not have to check for satellite constellation changes. In the event of a rising or setting satellite, the rover will inform the base station. However, it is necessary for the base station to check for cycle slips, since a cycle slip may occur independently at either the rover or base station.

In step 805, the system is turned on and the loop is started. The loop may run continuously until the system is turned off. In step 810, the base station checks for a cycle-slip on any satellite being tracked by the rover and base station. If there is a cycle-slip, the base station enables data transmission to the rover in step 815. If the base station does not detect a cycle-slip in step 810, it checks for a an "Enable request" from the rover in step 820. If an "Enable Request" has been received, the base station enables data transmission in step 815. If an "Enable Request" has not been received in step 820, the base station checks to-see if a "Disable Request" has been received from the rover in step 825. If a "Disable Request has been received in step 825, the base station repeats the loop. If a "Disable Request" has been received in step 825, the base station disables data transmission in step 830 prior to repeating the loop.

Figure 9:
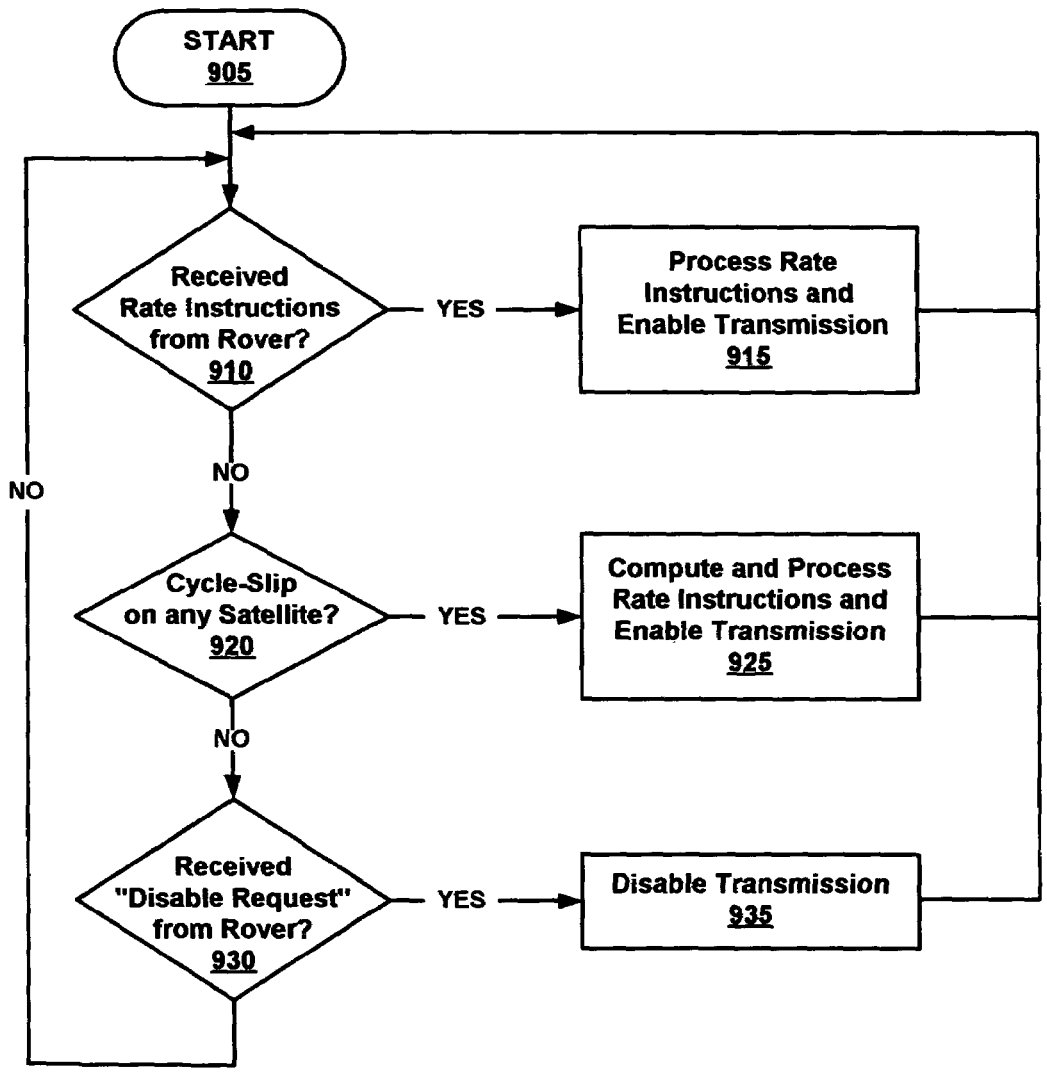
FIG. 9 shows a flow chart for a reference station process comprising rate instruction generation in accordance with an embodiment of the present claimed invention

FIG. 9 shows a flow chart diagram 900 for a base station process that includes the generation of data transmission rate instructions in addition to the enablement of data transmission. In step 905, the system is turned on and the loop is started. The loop may run continuously until the system is turned off. In step 910, the base station checks for data rate transmission instructions from the rover or rovers. If rate instructions are received from the rover in step 910, the rate instructions are processed and transmission enabled accordingly in step 915. If rate instructions from the rover are not received in step 910, the base station checks for a cycle-slip in step 920. If the base station detects a cycle slip in step 920, a data transmission rate is determined and transmission enabled accordingly in step 925. If a cycle-slip is not detected in step 920, the base station checks for receipt of a "Disable Request" from the rover in step 930. If a "Disable Request" has not been received from the rover in step 930, the loop is repeated. If a "Disable Request" is received in step 930, the base station disables transmission before repeating the loop.

Figure 10:
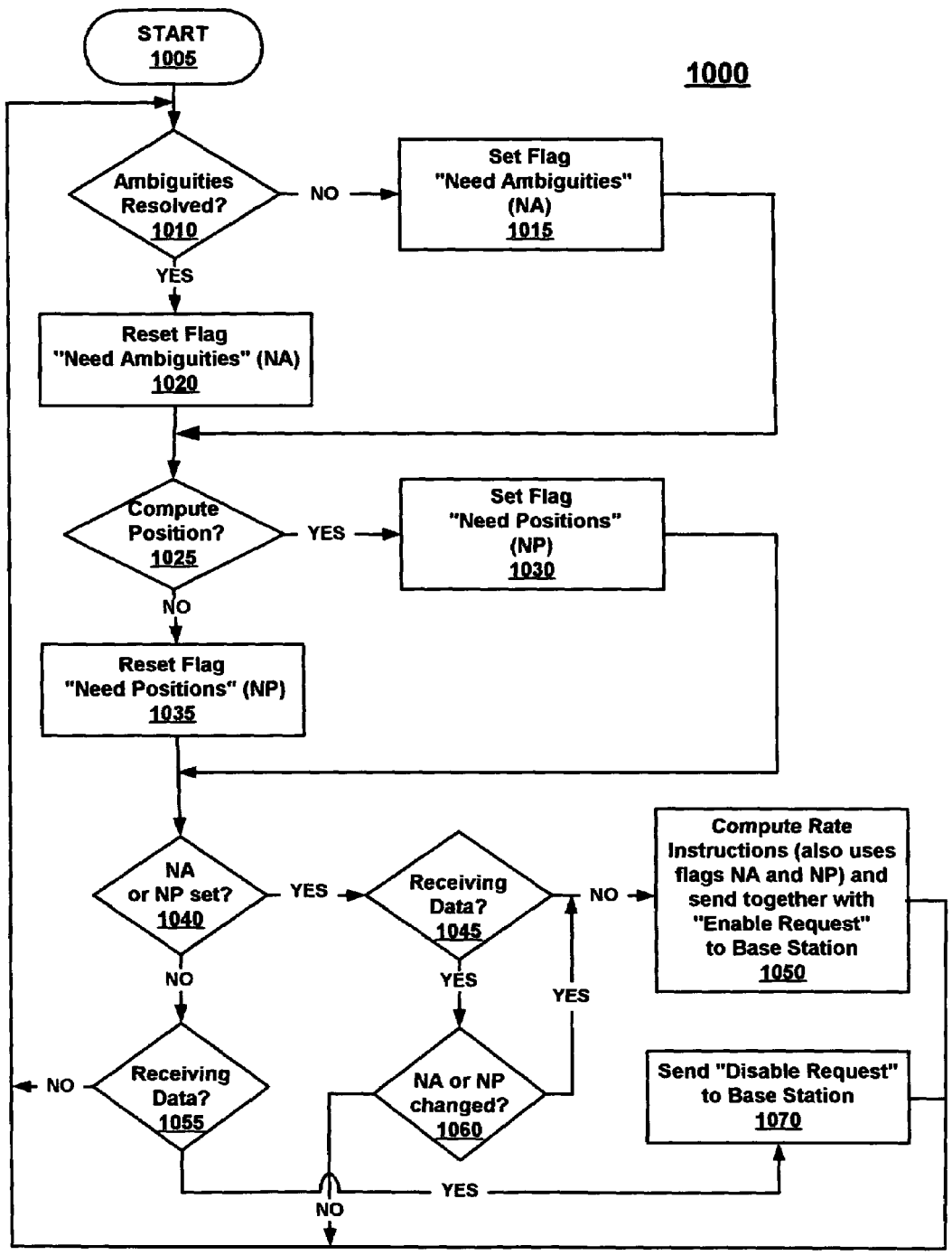
FIG. 10 shows a flow chart for a rover process comprising rate instruction generation in accordance with an embodiment of the present claimed invention.

FIG. 10 shows a flow chart diagram 1000 for a rover process that includes rate instruction generation. In step 1005, the system is turned on and the loop is started. In step 1010, the rover checks to see if there are ambiguities that require resolution. If it is determined in step 1010 that data for ambiguities is required, a "Need Ambiguities" (NA) flag is set in step 1015. If it is determined in step 1010 that there are no ambiguities that require resolution, the rover checks to see if data for positioning is required in step 1025. If data for positioning is required, a "Need Positions" (NP) flag is set in step 1030. If data for positioning is not required, the NP flag is reset in step 1035.

In step 1040, the status of the NA and NP flags is checked. If either of the NA and NP flags is set, a data reception check is made in step 1045. If data is not being received, then data rate transmission instructions are computed and sent with an "Enable request" to the base station in step 1050. It should be recognized that the data rate requirements for positioning and ambiguity resolution may be different. Therefore the generation of rate instructions depends on whether positioning is required (NP flag set) and whether ambiguity resolution is required (NA flag set).

It is possible that the system may be positioning with one data rate when a change of the ambiguity resolution state occurs (flag NA set). If data is being received in step 1045, a change in NA or NP flag status is determined in step 1060. If NA or NP flag status has changed, then step 1050 is executed, which results in generation of a new set of rate instructions followed by a transmission of these instructions from the rover to the base. This may increase or decrease the data rate. If neither the NA or NP flag status has changed in step 1060, the loop is repeated.

If neither of the NA or NP flags is set in step 1040, then a data reception check is made in step 1055. If data is not being received in step 1055, the loop is repeated. If data is being received, then a "Disable Request" is sent to the base station in step 1070 before repeating the loop. For the survey application, it is anticipated that the data for positioning is only enabled for a fraction of the time of the total survey. During the remaining time, the surveyor is moving between survey marks, and data for ambiguities will only be required infrequently. Alternatively, in dynamic applications such as Marine Surveying, Seismic surveys or Aerial surveys, the rover only needs the highest accuracy data when actually on a survey line but not when making turns etc. Thus, the method described can be used to significantly reduce the total quantity of data transmitted from a base station or base network.

For a GPRS system, reducing the quantity of data has a direct cost savings (charged per byte). For a radio modem, reducing the data rate can reduce broadcast congestion. It can also allow the use of TDMA (Time Division Multiple Access) using a single transmit frequency.

For the radio modem case, in which a single base is transmitting to multiple rovers on a single frequency, in a further embodiment of the present invention, the Rate Instruction Generator at the base must process information from all the rovers. For example, in the simplified case in which data is being enabled/disabled (constant rate), the base enables data transmission when any rover requests "enable data" (this can be considered equivalent to a logical OR operation), and the base disables data transmission when every rover requests "disable data" (this can be considered equivalent to a logical AND operation). If the data rate is variable, as determined by the Rate Instruction Generator, then data is always enabled at the fastest rate required by any rover, or the lowest common set of requirements at any time. Alternatively, the base may serve multiple rovers on multiple parallel communications channels.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

What is claimed is:

1. A method for variable rate data transmission for communication of real-time satellite positioning system (SATPS) data between a rover and a reference station comprising:
   acquiring raw SATPS data at said reference station;
   converting said raw SATPS data into formatted data;
   determining a transmission rate for said formatted data, wherein the data transmission rate is determined on the basis of rover calculation accuracy; and,
   controlling the transmission of said formatted data to said rover using a programmable transmission controller and a wireless transmitter.

2. The method of claim 1, further including receiving data at said reference station from said rover.

3. The method of claim 2, wherein said data comprises transmission rate control instructions.

4. The method of claim 1 further comprising:
   determining the transmission rate based upon satellite positioning system events.

5. The method of claim 1, further comprising:
   determining the transmission rate based upon the type of data transmitted.

6. The method of claim 1, further comprising:
   determining the transmission rate based upon the accuracy required by the rover.

7. The method of claim 1, further comprising:
   determining the transmission rate based upon a requirement for data for ambiguities.

8. The method of claim 1, wherein said data transmission is performed using TCP/IP and an IP socket selected from a plurality of IP sockets.

9. A computer readable medium containing executable instructions which, when executed in a real-time satellite positioning system (SATPS) having a reference station and a rover, causes the system to vary a data transmission rate between said reference station and said rover, comprising:
   instructions for acquiring raw SATPS data at said reference station;
   instructions for converting said raw SATPS data into formatted data;
   instructions for determining a transmission rate for said formatted data, wherein the instructions for determining the data transmission rate are generated on the basis of rover calculation accuracy; and,
   instructions for transmitting said formatted data to said rover using said transmission rate.

10. The computer readable medium of claim 9, further including instructions for receiving data at said reference station from said rover.

11. The computer readable medium of claim 10, wherein said data comprises instructions for controlling said transmission rate.

12. The computer readable medium of claim 9, wherein the instructions for determining a transmission rate are further based upon satellite positioning system events.

13. The computer readable medium of claim 9, wherein the instructions for determining a transmission rate are further based upon the type of data transmitted.

14. The computer readable medium of claim 9, wherein the instructions for determining a transmission rate are further based upon the accuracy required by the rover.

15. The computer readable medium of claim 9, wherein the instructions for the determining the data transmission rate are generated on the further basis of a requirement for data for ambiguities.

16. A method for variable rate data transmission for communication of real-time satellite positioning system (SATPS) data between a rover and a reference station comprising:
   acquiring SATPS data at said reference station;
   determining a transmission rate for said data based on current conditions of a set of criteria, wherein the data transmission rate is determined on the basis of rover calculation accuracy; and,
   controlling the transmission of said data to said rover using a programmable transmission controller and a wireless transmitter.

17. The method of claim 16, further including receiving data at said reference station from said rover.

18. The method of claim 17, wherein said data comprises transmission rate control instructions.

19. The method of claim 16, further comprising:
   determining the transmission rate based upon satellite positioning system events.

20. The method of claim 16, further comprising:
   determining the transmission rate based upon the type of data transmitted.

21. The method of claim 16, further comprising:
   determining the transmission rate based upon the accuracy required by the rover.

22. The method of claim 16, further comprising:
   determining the transmission rate based upon a requirement for data for ambiguities.

23. The method of claim 16, wherein said data transmission is performed using TCP/IP and an IP socket selected from a plurality of IP sockets.

24. A method for variable rate data transmission for communication of real-time satellite positioning system (SATPS) data between a rover and a reference station comprising:
   acquiring SATPS data at said reference station;
   determining a transmission rate for said data according to a predetermined set of criteria, wherein the data transmission rate is determined on the basis of rover calculation accuracy; and,
   dynamically controlling the transmission of said data to said rover using a programmable transmission controller and a wireless transmitter.

25. The method of claim 24, further including receiving data at said reference station from said rover.

26. The method of claim 25, wherein said data comprises transmission rate control instructions.

27. The method of claim 24, further comprising:
   determining the transmission rate based upon satellite positioning system events.

28. The method of claim 24, further comprising:
   determining the transmission rate based upon the type of data transmitted.

29. The method of claim 24, further comprising:
   determining the transmission rate based upon the accuracy required by the rover.

30. The method of claim 24, further comprising:
   determining the transmission rate based upon a requirement for data for ambiguities.

31. The method of claim 24, wherein said data transmission is performed using TCP/IP and an IP socket selected from a plurality of IP sockets.

* * * * *